Jan. 7, 1964     C. S. CHAPMAN, JR     3,116,815
BRAKE SYSTEM
Filed April 6, 1959     3 Sheets-Sheet 1
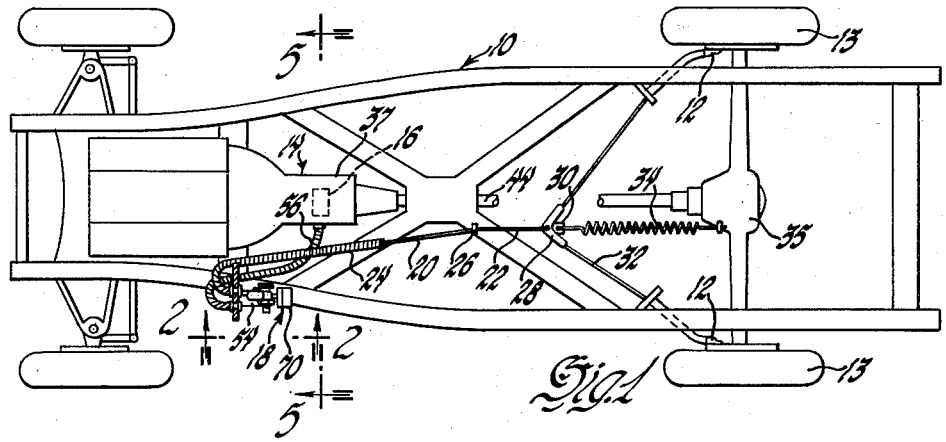
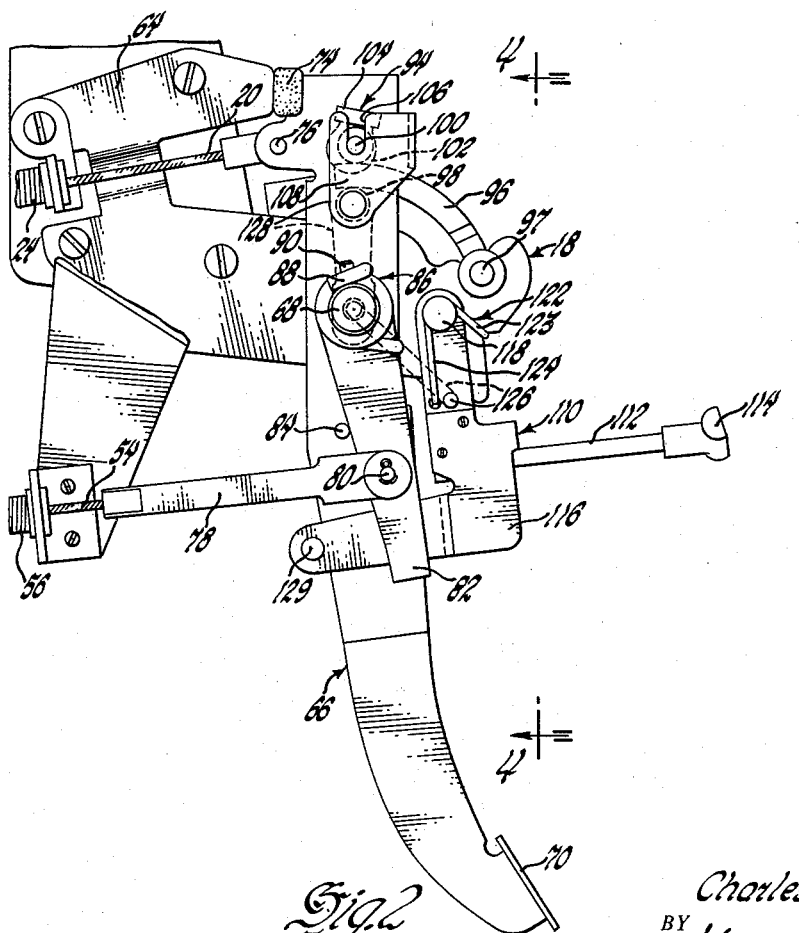
INVENTOR.
Charles S. Chapman, Jr.
BY
Hugh L. Fisher
ATTORNEY

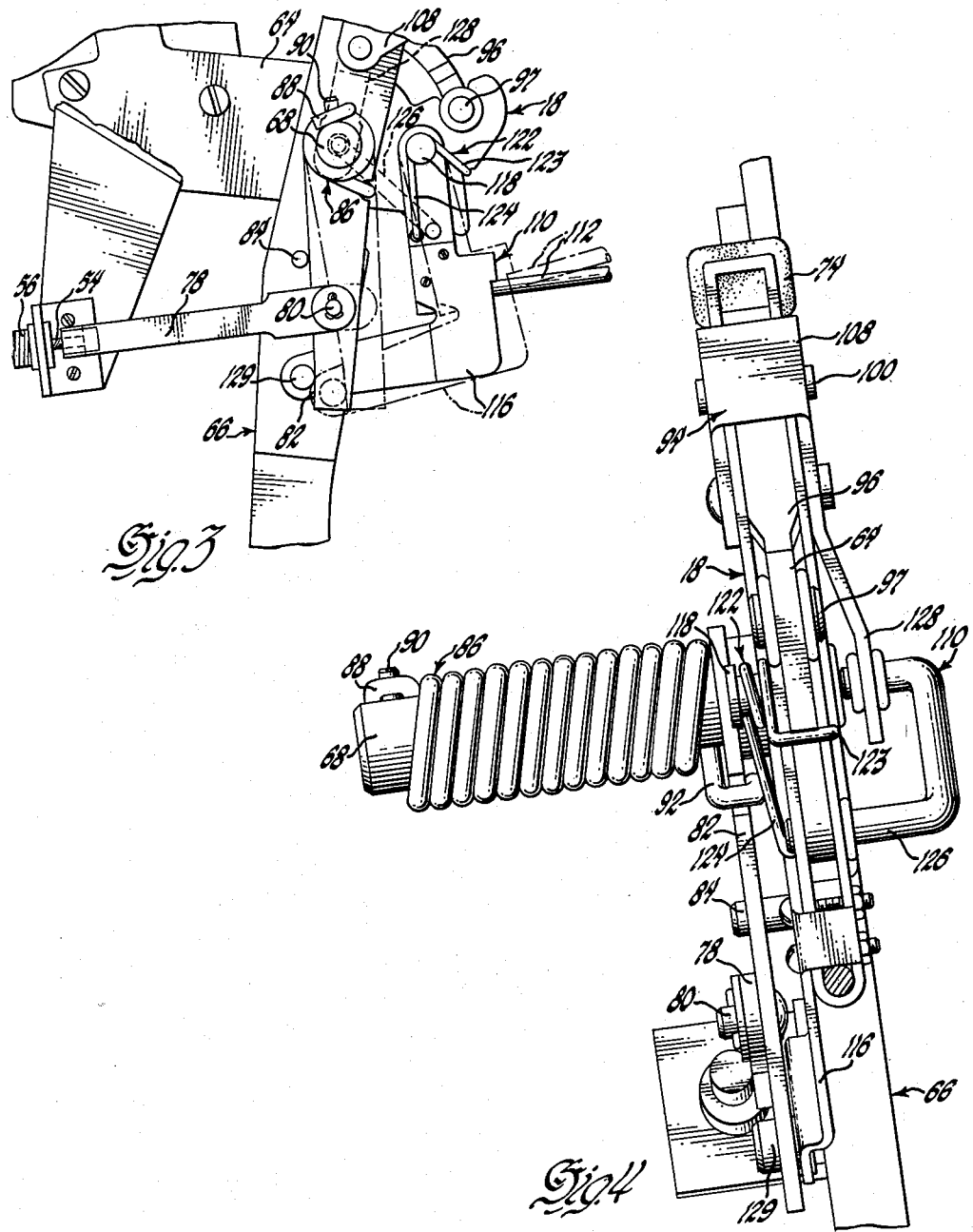

Jan. 7, 1964
C. S. CHAPMAN, JR
3,116,815
BRAKE SYSTEM
Filed April 6, 1959
3 Sheets-Sheet 3
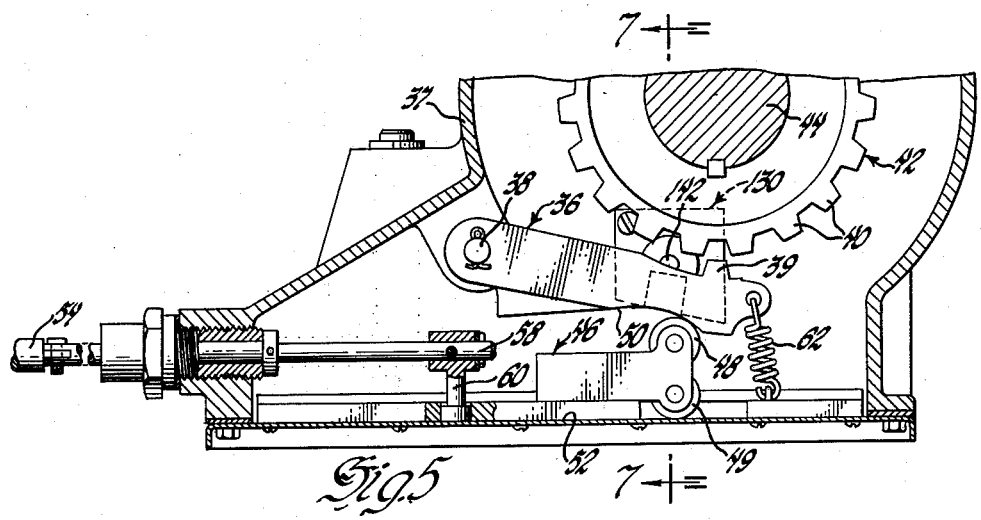
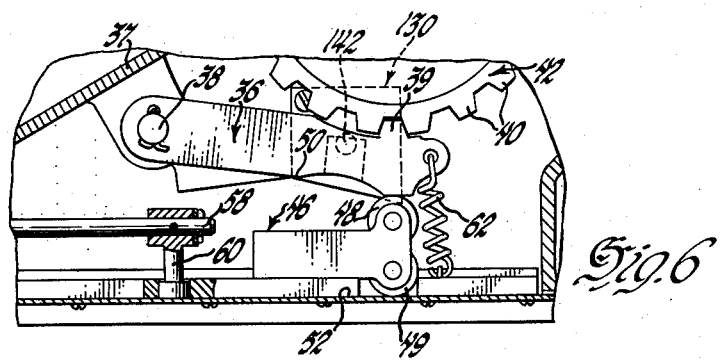
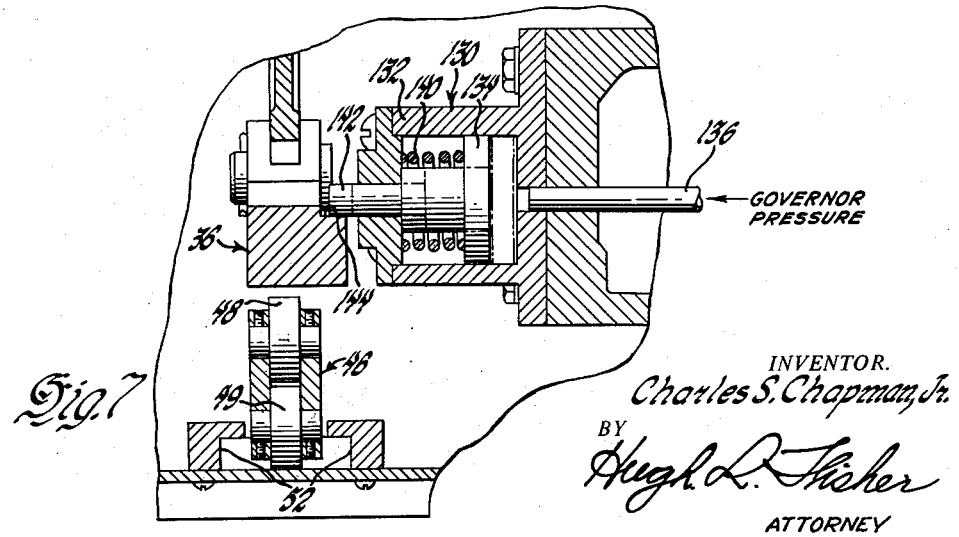
INVENTOR.
Charles S. Chapman, Jr.
BY
Hugh L. Fisher
ATTORNEY

United States Patent Office 3,116,815
Patented Jan. 7, 1964

3,116,815
BRAKE SYSTEM
Charles S. Chapman, Jr., Grand Blanc, Mich., assignor to General Motors Corporation, Detroit, Mich., a corporation of Delaware
Filed Apr. 6, 1959, Ser. No. 804,456
9 Claims. (Cl. 188—106)

This invention relates generally to brake systems and particularly to brake systems adapted for use, although not exclusively, with motor vehicles.

It is always desirable to reduce the number of controls that a vehicle driver must operate for many reasons, among which are safety considerations since the fewer controls enable a driver to more easily meet sudden emergencies, and also, fewer controls lessen the education needed to train drivers. A specific instance of the foregoing arose with the introduction of the automatic transmission, for, prior to this time, engine compression could be relied upon to aid in holding the vehicle stationary when parked, and this could be accomplished simply by placing the manual transmission gear shifter "in gear" thereby maintaining the gearing connection between the engine and the wheels. To supplement this braking from engine compression, the so-called emergency brake could also be utilized. However, with automatic transmissions, the connection between the engine and the wheels is, in general, lost when the engine is stopped, and therefore, it is necessary to provide for this by, e.g., affording a transmission parking brake. Usually this transmission parking brake is a positive type lock that has a toothed engagement with a member fixed on the transmission output shaft. The emergency brake then can be used for supplementing both the conventional wheel brakes and this transmission parking brake.

With the foregoing in mind, it is proposed by the invention to combine brake controls so that two brakes may be operated simultaneously by a single control.

More specifically, the invention contemplates employing a single vehicle brake control member for operating both the emergency brake and the transmission parking brake.

When employing a single brake control member for both the emergency brake and the transmission parking brake, as proposed, consideration must be given to the inherent dissimilarity both functionally and structurally between the emergency brake and the transmission parking brake. The transmission parking brake, being of a positive type and having a toothed engagement with a notched wheel on the output shaft, presents engaging and disengaging problems, e.g., when the transmission parking brake is engaged, it is possible for the teeth to be out of alignment so as to not engage until the notched wheel is revolved slightly, or when engaged, the intermeshing teeth may be under such an extreme load that it is very difficult to disengage them. Also, a concern is the fact that the emergency brake is desirably spring-released and, hence, the spring would resist engaging movement of the brake control member. Therefore, the spring for releasing the emergency brake must not be so strong that brake control operation requires excessive effort by the driver. Additionally, situations may arise where the emergency brake is needed to stop vehicle movement but the simultaneous engagement of the transmission parking brake would, because of the positive locking characteristic, cause the transmission parking brake to be damaged.

Therefore, the invention seeks to provide an arrangement for the foregoing brake system that affords a connection between the single brake control member and transmission parking brake for resiliently engaging and positively disengaging the transmission parking brake, that has a releasable locking provision for holding the brake control member in a brake engaging position, and that has means for resiliently moving the brake control member to the brake disengaging position.

The invention further makes provision for aiding the resilient means to return the brake control member to the brake disengaged position when the transmission parking brake offers excessive disengaging resistance.

Another aim of the invention is to prevent by novel means the engagement of the transmission parking brake when the vehicle is proceeding above a predetermined speed and a brake control member is operated to render the emergency brake effective.

In carrying out the invention, according to one embodiment thereof, a single brake control member accessible to the driver, is connected both to the emergency wheel brake and the transmission parking brake for simultaneous operation of each. The transmission parking brake includes a notched wheel revolvable with a transmission output shaft, a toothed pawl positioned so as to engage the notched wheel and prevent rotation of the shaft, and a pawl operator for moving the pawl to engaged and disengaged positions relative to the notched wheel. The brake control member connection with the pawl operator is such that the pawl operator is resiliently and positively moved respectively to engaged and disengaged positions relative to the pawl.

When the brake actuating member is moved to a brake engaged position, both brakes are engaged and a lock holds the brake control member in the engaged position. To remove the brake control member to a brake disengaged position, a release is afforded that unlocks the lock, and then a spring disengages both brakes and returns the brake control member to the disengaged position. In case the spring load is not sufficient to disengage the transmission parking brake, the release is so arranged that further effort by the driver will positively remove the brake actuating member to disengaged position.

If the vehicle is proceeding above a predetermined speed, an inhibitor is effective to prevent the transmission parking brake from being engaged. However, the brake control member may still be moved to the brake engaged position so as to engage the emergency brake.

The foregoing and other objects and advantages of the invention will be apparent from the following description and from the accompanying drawings in which:

FIGURE 1 is a plan view of a vehicle chassis on which an embodiment of a brake system demonstrating the invention is installed;

FIGURE 2 is a view looking in the direction of the arrows 2—2 in FIGURE 1, of a brake control mechanism for the brake system shown in the brake disengaged position;

FIGURE 3 is a fragmentary view, similar to FIGURE 2, of the brake control mechanism shown in the brake engaged position;

FIGURE 4 is a view of FIGURE 2 looking in the direction of the arrows 4—4 in FIGURE 2;

FIGURE 5 is a view taken along line 5—5 of FIGURE 1 of a transmission parking brake depicted disengaged;

FIGURE 6 is a partial view, similar to FIGURE 5, of the transmission parking brake demonstrated in the engaged position; and FIGURE 7 is a sectional view taken along line 7—7 of FIGURE 5 illustrating an inhibitor for the transmission parking brake.

Referring first to FIGURE 1, the numeral 10 designates, generally, a vehicle chassis on which are installed a set of emergency brakes 12 coacting to brake the rear wheels 13 of the vehicle in any appropriate manner, a transmission 14 incorporating a transmission parking brake 16 best shown in FIGURES 5, 6, and 7, and a brake control mechanism viewed generally at 18 incorporating the principles of the invention.

The emergency brakes 12 may be connected to the brake control mechanism 18 in any known way such as shown in the preferred embodiment. As viewed, an emergency brake cable 20 is arranged so as to have the upper end thereof joined to the brake control mechanism 18 and the lower end connected to a rod 22. The emergency brake cable 20 is enclosed by a protective sheath 24 that is appropriately fixed at opposite ends. Rod 22 is slidably supported at one end by a guide 26 supported by the vehicle in a suitable fashion, and at the other end is connected to a guide sheath 28 by an adjusting nut 30. The guide sheath 28 slidably encloses a cable 32 connected to each emergency brake 12. Exerting a bias on the emergency brake cable 20 is a cable spring 34 interposed between the guide sheath 28 and a part of the vehicle such as differential housing 35. The cable spring 34, in exerting a bias on the brake control mechanism 18, will hold the brake control mechanism 18 in a brake disengaged position as will be explained. The adjusting nut 30 permits the bias of the cable spring 34 to be altered and controls the slack in the cable 20 as well as the cable 32.

The transmission parking brake 16, viewed in FIGURE 5, employs a brake element as pawl 36 that is pivotally supported by a casing 37 for the transmission 14 at 38. The pawl 36 is formed on the upper side with a tooth 39 arranged so as to intermesh with a series of teeth 40 on a gear wheel 42. The gear wheel 42 is either integral with, or fixedly attached to, a transmission output or wheel drive shaft 44. Movement of the pawl 36 to the FIGURE 6 engaged position in which teeth 40 intermesh with pawl tooth 39, is produced by a carrier 46 on which are revovably supported upper and lower rollers 48 and 49. The rollers 48 and 49 not only engage each other, but the upper roller 48 also engages a pawl surface 50 on the underside of the pawl 36, while the lower roller 49 engages a guide track 52. The carrier 46 is in turn moved by the brake control mechanism 18 through a parking brake cable 54 enclosed by a sheath 56 shown fixed at opposite ends in the manner of the emergency brake cable sheath 24. The lower end of the parking brake cable 54 is affixed to a rod 58, which extends within the transmission casing 37 and attaches to a drive pin 60. Drive pin 60. Drive pin 60 at the lower end is joined to the carrier 46 so that the carrier 46 may be moved by the brake control mechanism 18 through the agency of the cable 54 between the FIGURE 5 pawl disengaged position to the FIGURE 6 pawl engaged position. A spring 62 aids in removing the pawl 36 from the engaged position and maintains contact between the upper roller 48 and the pawl surface 50 thereby insuring against rattles and possible undesired lost motion.

The tooth side angles on the gear wheel teeth 40 and the pawl tooth 39 determine the load that the pawl removal spring 62 must exert. So, preferably, these tooth side angles are selected to encourage disengagement under load, and therefore, when the carrier 46 is in the FIGURE 5 disengaged position, the tooth side angles with the assistance of the spring 62 will eject the pawl tooth 39 if under load. Otherwise, the spring 62 will be adequate. When the carrier 46 is in the pawl engaged position depicted in FIGURE 6, it can be seen that the upper roller 48 is stationed opposite the straight portion of the pawl surface 50 and the rollers 48 and 49 together align so as to form a substantially straight line extending through the pawl tooth 39 and perpendicular to the guide track 52. Consequently, the disengaging load is transferred through the rollers 48 and 49 to the guide track 52, which can be a part of the transmission casing 37.

Although the foregoing type parking brake mechanism 16 has been described and is utilized in this embodiment, other type parking brakes may be utilized as will be apparent to those versed in the art. Additionally, the parking brake 16 does not have to be within the transmission casing 37 but may be exterior thereof and still function to brake the wheel drive shaft 44.

Now referring to FIGURES 2, 3, and 4, the brake control mechanism 18 illustrated is positioned within the driver compartment and arranged for left foot operation. Of course, the brake control mechanism 18 can be positioned for right foot operation or can be arranged for actuation by either hand if desired. The brake control mechanism 18 comprises a bracket 64 secured to a part of the vehicle, for instance, the instrument panel or body fire wall, and has a pedal lever 66 pivotally supported on a shaft 68 secured to the bracket 64. The lower end of the pedal lever 66 is provided with a foot pad 70 and the upper end is arranged to engage in the brake disengaged position of FIGURE 2 a resilient stop 74. This resilient stop 74 may be joined either to the pedal lever 66 or the bracket 64 and in addition to forming a stop, prevents rattles between the coacting metallic surfaces. The emergency brake cable 20 is attached at 76 to the upper end of the pedal lever 66 so that the cable spring 34 will cause the pedal lever 66 to be in the FIGURE 2 position against the stop 74 when there is no restraint on the pedal lever 66 as will become apparent. The transmission parking brake cable 54 through link 78 is pivotally joined at 80 to a parking brake actuator lever 82. Lever 82 is revolvably supported on shaft 68 and is urged against a stop pin 84 by a windup spring 86 surrounding the shaft 68. One end 88 of the spring 86 is joined to a pin 90 attached to shaft 68, whereas the opposite end 92 is against the side of the brake actuator lever 82 such that the brake actuator lever 82 is normally urged into engagement with the pin 84 on the pedal lever 66.

To hold the pedal lever 66 in the FIGURE 3 brake engaged position, a locking device shown generally at 94 is employed. This locking device 94 includes an arcuate bar 96 pivotally joined at 97 to the bracket 64. As can be seen in FIGURE 2, the bar 96 is positioned between a guide roller 98 rotatably supported on the upper end of the pedal lever 66 and a wedge roller 100 extending through an opening 102 in the upper end of the pedal lever 66, which roller 100 in turn engages a wedge block 104 formed integral or otherwise secured to the pedal lever 66. The reduced diameter ends of the wedge roller 100 are received by outwardly opening slots 106 in a wedge roller carrier 108 that is pivotally supported by the pedal lever 66 on the same axis as that of the guide roller 98. The bottom surface of the wedge block 104 in engagement with the upper side of the wedge roller 100 forms a wedge angle with a line tangent to the upper surface of the bar 96 at the point of contact between the bar 96 and the wedge roller 100. Also, the radius of the arcuate bar 96 is considerably greater than that of the guide roller 98. Therefore, when the pedal lever 66 is depressed, the wedge roller 100 will move into wedging relationship with the wedge block 104 and the bar 96, and the force exerted by the cable spring 34 will maintain this wedge relationship.

Once the locking device 94 is effective, the wedging relationship can only be interrupted by a release mechanism viewed generally at 110. The release mechanism 110 is provided with a release rod 112 that has a release knob 114 installed on the outer end for manual operation thereof and that has the opposite end fixedly joined to an L-shaped lever 116. The L-shaped lever 116 is pivotally supported on the bracket 64 by a pin 118 and is biased to a normal released position by a torsion spring 122 surrounding pin 118 so as to have one end 123 grounded to the bracket 64 and another end 124 connected to lever 116. Pivotal movement of the lever 116 is transferred through a connecting rod 126 to a downwardly extending arm 128 of roller carrier 108.

When the release knob 114 is moved upwardly to the FIGURE 3 broken line position so as to cause the L-shaped lever 116 to revolve counterclockwise, the roller carrier 108 will likewise be revolved counterclockwise about the axis of the guide roller 98 and from the wedging position with respect to wedge block 104 and arcuate bar 96. The cable spring 34 then is effective to return the pedal lever 66 to the FIGURE 2 position, and additionally, a retracting pin 129 secured to the L-shaped lever 116 so as to be adjacent the front side of the parking brake actuator lever 82 will engage the actuator lever 82 and aid in returning the pedal lever 66 back to the FIGURE 2 position if more effort is exerted on the release knob 114. Upon release of the knob 114, the L-shaped lever 116 and rod 112 will again assume the solid line FIGURE 3 released position.

Because, during operation, with the vehicle moving, it may be necessary to use the emergency brakes 12, provision is made for preventing the parking brake 16 from becoming engaged and resulting in damage to the transmission due to the positive braking action. This is accomplished by an inhibitor 130 displaced in FIGURE 7. The inhibitor 130 has a servomotor 132 attached to the transmission casing 37 adjacent the pawl 36 as seen in FIGURE 7. Slidably positioned within the servomotor 132 is a piston 134. A conduit 136 is in communication with a suitable source of governor pressure (not shown) that is responsive to vehicle speed and transfers this pressure to the face of the piston 134, urging the piston to the left against the bias from a spring 140 so that a piston end 142 will engage a projecting surface 144 on the side of the pawl 36 and prevent engagement of the pawl tooth 39 with the gear wheel teeth 40. This governor pressure should be adequate as soon as vehicle movement starts to prevent the pawl 36 from being engaged.

To summarize the operation, consider first the events occurring when the vehicle operator depresses pedal lever 66. This action will revolve the pedal lever 66 clockwise from the FIGURE 2 brake disengaged position to the FIGURE 3 brake engaged position. As a result, the emergency brake cable 20 will be placed under tension and cause emergency brakes 12 to be engaged. It should be mentioned here that the pedal lever 66 may be fully depressed to obtain a complete engagement of the emergency brakes 12 or only partially depressed to provide a lesser engagement, the amount being determined by the desires of the vehicle operator. However, to effect an engagement of the transmission parking brake 16, preferably the geometry of the arrangement is such that the pedal lever 66 must be fully depressed. Then, when fully depressed and the operator removes his foot from the foot pad 70, the locking device 94 will become effective and the wedge relationship, before discussed, between the wedge roller 100 and the engaging surfaces on the arcuate bar 96 and wedge block 104 will become effective to maintain the pedal lever 66 in this fully depressed brake engaged position. The cable spring 34 exerts a force through the emergency brake cable 20 as has been explained, that tends to revolve the pedal lever 66 counterclockwise and thereby maintain this wedge relationship. With the emergency brakes 12 fully engaged, the rear wheels 13 of the vehicle will be held.

As for the transmission parking brake 16, the windup spring 86 will continue in effect and hold the parking brake actuator lever 82 against stop pin 84 on the pedal lever 66 during depression of the pedal lever 66. As a result, the transmission parking brake cable 54 through link 78 at one end and through the rod 58 at the other end will move the carrier 46 to the right as viewed in FIGURES 5 and 6 and towards the pawl engaged position. Carrier 46 in turn, then, will revolve the pawl 36 upwardly towards the locking position relative to gear wheel 42. If the pawl tooth 39 engages the top of one of the gear wheel teeth 40, further movement of the carrier 46 will be stopped and the actuator lever 82 will move away from stop pin 84 causing the spring 86 to wind up while allowing the pedal lever 66 to continue to the brake engaged position. Upon subsequent slight rotational movement of the transmission output shaft 44, the pawl tooth 39 and the gear wheel teeth 40 will become aligned so that an engagement can take place, and the windup spring 86 because of the buildup energy will quickly move the parking brake actuator lever 82 back against the stop 84 to thereby afford a resilient engagement of the parking brake 16. This will force the carrier 46 to the FIGURE 6 position and the pawl 36 will be in the engaged and locking position.

If the vehicle is moving when the pedal lever 66 is depressed and if the governor pressure corresponding to this speed of the vehicle delivered by conduit 136 to the parking brake inhibitor servomotor 132 is sufficient to overcome the bias from the spring 140, the piston rod end 142 of the inhibitor piston 134 will be forced outwardly into engagement with the projecting surface 144 on the pawl 36 and restrain movement of the pawl 36 to the engaged position. Again, the actuator lever 82 will adjust for this condition and the resultant windup of spring 86 will permit the pedal lever 66 to be moved to the fully depressed and brake engaged position. When the vehicle speed decreases so that governor pressure can no longer maintain the inhibitor 130 in effect, the spring 140 will force the inhibitor piston 134 back to the inoperative position and then the windup spring 86 will cause the pawl 36 to be moved to the engaged position, assuming the tooth alignment permits this.

When the vehicle operator wishes to disengage the emergency brakes 12 and the transmission parking brake 16, if engaged, the release knob 114 on the outer end of the release rod 112 is lifted upwardly so as to revolve the L-shaped lever 116 counterclockwise as viewed in FIGURE 3 and to the broken line position there demonstrated. When the operator does this, two events occur. The connecting rod 126 will exert a pull on the arm 128 of the roller carrier 108 and revolve the roller carrier 108 along with wedge roller 100 in a counterclockwise direction about the axis of guide roller 98. In revolving the wedge roller carrier 108 in this direction, the wedging relationship is interrupted and the cable spring 34 becomes immediately effective to revolve pedal lever 66 counterclockwise and back to the brake disengaged position in which position the upper edge of the pedal lever 66 engages resilient stop 74.

If in pulling upwardly on the release knob 114, resistance from the transmission parking brake 16 is offered through a positive connection extending from pedal lever 66, the stop 84 thereon, the lever 82, the link 78, the cable 54, the rod 58 and the drive pin 60 to the carrier 46, and the cable spring 34 cannot overcome this resistance, the operator may increase the lifting force on the release knob 114. Then the retracting pin 129 becomes operative and engages the edge of the parking brake actuator lever 82 exerting a pull thereon. As a result, another positive connection that proceeds from the release knob 114 through release rod 112, L-shaped lever 116, and retracting pin 129 to the actuator lever 82 becomes effective. From the lever 82, this same positive connection continues through link 78, the parking brake cable 54, rod 58, and drive pin 60, to the carrier 46. The leverage afforded from the geometry of the various levers comprising this positive connection will be adequate to cause with a slight additional force on the release knob 114 the carrier 46 to be removed to the FIGURE 5 pawl unlocked position. With restraint on the pawl 36 removed, the pawl removal spring 62 will along with the angular relationship of the pawl tooth 39 and the gear wheel teeth 40 eject the pawl 36 from the tooth engaging position, and both brakes 16 and 12 will be disengaged.

As can be seen, control of the emergency brakes 12 and the transmission parking brake 16 is assigned to the single pedal lever 66. Consequently, two steps are not required of the vehicle operator, namely, placing the transmission selector lever in a Park setting or equivalent to engage the transmissiong parking brake 16 and also actuating a brake lever to engage the emergency brakes 12. Moreover, full use of the emergency brakes 12 is possible without interference from the transmission parking brake 16 due to the provision of the parking brake inhibitor 130. The locking and unlocking problems of the transmission parking brake 16 are solved by the resilient engaging connection afforded by windup spring 86 and the positive connection afforded by the retracting pin 129 on the L-shaped lever 116. By controlling both the emergency brakes 12 and the transmission parking brake 16 with a single control as pedal lever 66, the number of separate mechanisms required are reduced inasmuch as the needs of each can be advantageously combined.

Another consideration is the fact that formerly with separate controls, the vehicle operator often only engaged either the transmission parking brake or the emergency brakes, and therefore, did not derive full benefit from each. Now, one operation renders effective both the emergency brakes and the transmission parking brake with the result that both contribute to the desired result.

The invention is to be limited only by the following claims.

I claim:

1. In a vehicle brake system, the combination of a wheel brake, an auxiliary brake, brake control means for simultaneously operating both brakes, locking means for causing the brake control means to be maintained in a brake engaged position, inhibitor means responsive to the speed of the vehicle and effective above a predetermined vehicle speed for preventing the brake control means from rendering the auxiliary brake operative when the wheel brake is rendered operative, and releasing means for unlocking the locking means so as to permit the brake control member to return to a brake disengaged position, the releasing means including means for disengaging the auxiliary brake.

2. In a vehicle brake system, the combination of a wheel brake, an auxiliary brake, a brake control member operatively connected to both brakes and movable between brake engaged and disengaged positions for simultaneously operating both brakes, locking means for holding the brake control member in the brake engaged position, bias means urging the brake control member to the brake disengaged position, and releasing means arranged for unlocking the locking means, the releasing means including means for facilitating the movement of the brake control member to the brake disengaged position by the bias means and also for facilitating the release of one of the brakes.

3. In a vehicle brake system, the combination of a wheel brake, a wheel drive shaft brake, a brake control member movable between brake engaged and disengaged positions and having connections with both brakes for simultaneous operation thereof, the connection between the wheel drive shaft brake and the brake control member including means affording both a resilient engagement and a positive disengagement of the wheel drive shaft brake, releasable locking means for holding the brake control member in the brake engaged position, resilient means for returning the brake control member to the disengaged position, and means releasing the locking means, the releasing means including means assisting the resilient means in returning the brake control member to the disengaged position.

4. In a brake system for a vehicle having a wheel drive shaft, the combination of a wheel brake, a parking brake including a brake element for preventing rotation of the wheel driving shaft and brake element operating means having engaged and disengaged positions for respectively engaging and disengaging the brake element, a manually operated brake control member having connections with both the wheel brake and the brake element operating means for simultaneous operation thereof, the brake control member being movable between a brake engaged position in which both brakes are engaged and a brake disengaged position in which both brakes are disengaged, the connection between the brake control member and the brake element operating means including means causing the brake element to be resiliently moved to the engaged position and positively removed to the disengaged position, locking means for holding the brake control member in the brake engaged position, releasing means for unlocking the locking means, and resilient means for returning the brake control member to the brake disengaged position, the releasing means including means assisting the resilient means in moving the brake control member to the disengaged position.

5. In a brake system for a vehicle, the combination of a wheel brake, a transmission parking brake including a brake element for positively preventing rotation of a transmission output shaft and brake element operating means having engaged and disengaged positions for respectively engaging and disengaging the brake element, a manually operated brake control member having connections with both the wheel brake and the brake element operating means for simultaneous operation thereof, the brake control member being movable between brake engaged and disengaged positions, the connection between the brake control member and the brake element operating means including means causing the brake element operating means to be resiliently moved to the engaged position and positively removed to the disengaged position, locking means for holding the brake control member in the brake engaged position, releasing means for unlocking the locking means, resilient means for returning the brake control member to the brake disengaged position, the releasing means being arranged so as to assist the resilient means in moving the brake control member to the disengaged position, and inhibitor means responsive to the speed of the vehicle for preventing the brake element from being engaged above a predetermined vehicle speed when the brake control member is moved to the brake engaged position.

6. In a brake system for a vehicle, the combination of an emergency wheel brake, a transmission parking brake including a notched member revolvable with a transmission output shaft, a toothed pawl arranged to engage the notched wheel and prevent rotation of the wheel driving shaft, and pawl operating means having engaged and disengaged positions for respectively engaging and disengaging the pawl with respect to the notched wheel, a pedal operated brake control member movable between brake engaged and disengaged positions, the brake control member having connections with both the emergency wheel brake and the pawl operating means for simultaneous operation thereof, the connection between the brake control member and the pawl operating means including means causing the pawl operating means to be resiliently moved to the engaged position and positively removed to the disengaged position, locking means for holding the brake control member in the brake engaged position, releasing means for unlocking the locking means, and resilient means for returning the brake control member to the brake disengaged position when the releasing means is operated so as to unlock the locking means, the releasing means including means rendered operative when the releasing means is operated to assist the resilient means in returning the brake control member to the brake disengaged position.

7. In a brake system for a vehicle, the combination of an emergency wheel brake, a transmission parking brake including a notched member revolvable with a transmission output shaft, a toothed pawl arranged to engage the notched wheel and prevent rotation of the wheel driving shaft, and a pawl operator having engaged and disengaged positions for respectively engaging and disengaging the pawl with respect to the notched wheel, a pedal operated brake control member movable between brake engaged and disengaged positions, the brake control member having cable connections with both the emergency wheel brake and the pawl operator for simultaneous operation thereof, the cable connection between the brake control member and the pawl operator including a windup spring for resiliently moving the pawl operator to the engaged position and an abutment for positively moving the pawl operator to the disengaged position, locking means for holding the brake control member in the brake engaged position, releasing means for unlocking the locking means, a cable spring for returning the brake control member to the brake disengaged position when the releasing means is operated so as to unlock the locking means, the releasing means being arranged to assist the cable spring in returning the brake control member to the brake disengaged position, and inhibitor means responsive to vehicle speed and coacting with the pawl above a predetermined vehicle speed for preventing the pawl from engaging the notched member when the brake control member is moved to the brake engaged position.

8. In a vehicle brake system, the combination of a wheel brake, an auxiliary brake, a brake control member operatively connected to the wheel brake and movable between brake engaged and disengaged positions for operating the wheel brake, locking means for holding the brake control member in the brake engaged position, bias means urging the brake control member to the brake disengaged position, and releasing means arranged for unlocking the locking means, the releasing means including means for exerting a force so as to facilitate release of the auxiliary brake by the bias means.

9. In a vehicle brake system, the combination of a wheel brake, an auxiliary brake, a brake control member operatively connected to both brakes and movable between brake engaged and disengaged positions for simultaneously operating both brakes, locking means for holding the brake control member in the brake engaged position, and releasing means for unlocking the locking means so as to permit the brake control member to return to the brake disengaged position, the releasing means including means for positively disengaging the auxiliary brake.

References Cited in the file of this patent

UNITED STATES PATENTS

| | | |
|---|---|---|
| 1,348,331 | Stringer | Aug. 3, 1920 |
| 1,532,868 | Blackburn | Apr. 7, 1925 |
| 1,724,127 | Christensen | Aug. 13, 1929 |
| 2,140,040 | White | Dec. 13, 1938 |
| 2,670,064 | Hasbany | Feb. 23, 1954 |
| 2,759,569 | Keehn | Aug. 21, 1956 |
| 2,817,420 | Ulinski | Dec. 24, 1957 |
| 2,860,731 | Hause | Nov. 18, 1958 |
| 2,860,735 | Grover et al. | Nov. 18, 1958 |
| 2,871,999 | Hemphill | Feb. 3, 1959 |
| 2,910,156 | Apple | Oct. 27, 1959 |
| 2,912,085 | DeLoren | Nov. 10, 1959 |

UNITED STATES PATENT OFFICE
CERTIFICATE OF CORRECTION

Patent No. 3,116,815                          January 7, 1964

Charles S. Chapman, Jr.

It is hereby certified that error appears in the above numbered patent requiring correction and that the said Letters Patent should read as corrected below.

Column 1, line 60, after "control" insert -- member --; column 3, lines 45 and 46, strike out "Drive pin 60."; column 5, line 20, for "displaced" read -- displayed --; column 7, line 1, for "transmissiong" read -- transmission --; line 3, for "with" read -- with- --; column 10, line 27, for "DeLoren" read -- DeLorean --.

Signed and sealed this 2nd day of June 1964.

(SEAL)
Attest:

ERNEST W. SWIDER                              EDWARD J. BRENNER
Attesting Officer                                  Commissioner of Patents